United States Patent
Yang

(10) Patent No.: US 9,270,184 B2
(45) Date of Patent: Feb. 23, 2016

(54) CONTROL CIRCUIT AND TERMINAL FOR CABLE COMPENSATION AND WAKE-UP OF PRIMARY-SIDE REGULATED POWER CONVERTER

(71) Applicant: SYSTEM GENERAL CORP., Taipei Hsien (TW)

(72) Inventor: Ta-Yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 119 days.

(21) Appl. No.: 14/040,907

(22) Filed: Sep. 30, 2013

(65) Prior Publication Data
US 2014/0092645 A1 Apr. 3, 2014

Related U.S. Application Data

(60) Provisional application No. 61/708,096, filed on Oct. 1, 2012.

(51) Int. Cl.
*H02M 3/335* (2006.01)
*H02M 1/00* (2007.01)

(52) U.S. Cl.
CPC ...... *H02M 3/33515* (2013.01); *H02M 3/33507* (2013.01); *H02M 2001/0032* (2013.01); *Y02B 70/16* (2013.01)

(58) Field of Classification Search
CPC .............. H02M 3/33507; H02M 2001/0032; H02M 3/335
USPC ............ 323/222, 224, 266–268, 271–275, 323/282–290; 363/21.01, 21.8, 21.12, 363/21.13, 12.18, 41, 50, 21.08, 21.15, 363/21.18
See application file for complete search history.

(56) References Cited

U.S. PATENT DOCUMENTS

| | | | | |
|---|---|---|---|---|
| 5,331,562 A | * | 7/1994 | McGuffin | G01C 21/005 342/63 |
| 5,994,885 A | * | 11/1999 | Wilcox et al. | 323/285 |
| 6,011,706 A | * | 1/2000 | Adragna et al. | 363/41 |
| 6,597,159 B2 | * | 7/2003 | Yang | H02M 3/33507 323/283 |
| 6,721,192 B1 | | 4/2004 | Yang et al. | |
| 6,853,563 B1 | | 2/2005 | Yang et al. | |
| 7,016,204 B2 | | 3/2006 | Yang et al. | |
| 7,352,595 B2 | * | 4/2008 | Yang et al. | 363/21.13 |
| 7,362,593 B2 | | 4/2008 | Yang et al. | |
| 8,879,289 B2 | * | 11/2014 | Lin | H02M 3/33507 363/21.18 |
| 2011/0261596 A1 | * | 10/2011 | Zong | H02M 3/33507 363/21.13 |
| 2012/0195076 A1 | * | 8/2012 | Zhang | H02M 3/33523 363/21.12 |

* cited by examiner

*Primary Examiner* — Rajnikant Patel
(74) *Attorney, Agent, or Firm* — Rosenberg, Klein & Lee

(57) ABSTRACT

A control circuit of a power converter is provided. It comprises a signal generation circuit generating an oscillation signal in accordance with an output load. A PWM circuit generates a switching signal according to a voltage-loop signal, a current-loop signal and the oscillation signal for regulating an output of the power converter. A regulation circuit receives a compensation signal for an output cable compensation and a wake-up. The compensation signal is coupled to increase a switching frequency of the switching signal once the output of the power converter is lower than a low-voltage threshold. The control circuit reduces the voltage drop of the output when the output load is changed.

12 Claims, 12 Drawing Sheets

US 9,270,184 B2

CONTROL CIRCUIT AND TERMINAL FOR CABLE COMPENSATION AND WAKE-UP OF PRIMARY-SIDE REGULATED POWER CONVERTER

REFERENCE TO RELATED APPLICATION

This application is based on Provisional Application Ser. #61/708,096, filed 1 Oct. 2012, currently pending.

BACKGROUND OF THE INVENTION

1. Field of Invention

The present invention relates to a power converter, and more specifically relates to a control circuit of the power converter.

2. Description of the Related Art

The primary side regulation technologies had been disclosed in many prior arts such as, "PWM controller regulating output voltage and output current in primary side", U.S. Pat. No. 6,721,192; "Primary-side controlled flyback power converter", U.S. Pat. No. 6,853,563; "Close-loop PWM controller for primary-side controlled power converters", U.S. Pat. No. 7,016,204; and "Switching control circuit having off-time modulation to improve efficiency of primary-side controlled power supply", U.S. Pat. No. 7,362,593 etc. The drawback of these prior arts is the slow response to the change of the output load, particular when the power converter is operated in light load and no load.

FIG. 1 is a circuit schematic of a prior art of a primary side regulation power converter. A transformer 10 has a primary winding $N_P$, a secondary winding $N_S$, and an auxiliary winding $N_A$. A terminal of the primary winding $N_P$ is coupled to an input voltage $V_{IN}$. The secondary winding $N_S$ generates an output voltage $V_O$ via a diode 40 and a capacitor 45. A transistor 20 is coupled to the other terminal of the primary winding $N_P$ to switch the transformer 10 for transferring the energy from the input voltage $V_{IN}$ to the output voltage $V_O$ of the power converter. When the transistor 20 is turned on, the transformer 10 is magnetized. The transformer 10 is demagnetized and the energy of the transformer 10 is delivered to the capacitor 45 via the diode 40 for generating the output voltage $V_O$ once the transistor 20 is turned off. Meanwhile, a reflected voltage $V_{AUX}$ is generated at the auxiliary winding $N_A$ of the transformer 10. The reflected voltage $V_{AUX}$ is correlated to the output voltage $V_O$.

A voltage divider developed by resistors 51 and 52 is coupled to the auxiliary winding $N_A$ for generating a reflected signal $V_S$ in response to the reflected voltage $V_{AUX}$ of the auxiliary winding $N_A$. The reflected signal $V_S$ is thus correlated to the reflected voltage $V_{AUX}$. The reflected voltage $V_{AUX}$ is correlated to the output voltage $V_O$ during the period that the transformer 10 is demagnetized. In other words, the reflected signal $V_S$ is also correlated to the output voltage $V_O$.

A controller 50 is coupled to sample the reflected voltage $V_{AUX}$ of the transformer 10 through the auxiliary winding $N_A$ of the transformer 10, the resistors 51 and 52 to generate a switching signal $S_W$ for switching the transformer 10 and regulating the output voltage $V_O$. As mentioned above, the reflected signal $V_S$ is correlated to the reflected voltage $V_{AUX}$ and the transistor 20 is controlled by the switching signal $S_W$. The controller 50 is further coupled to receive a current-sense signal $V_{CS}$ for adjusting the witching signal $S_W$. A current-sense device 30, such as a resistor, is coupled between the transistor 20 and the ground. The current-sense device 30 senses a switching current $I_P$ of the transformer 10 and generates the current-sense signal $V_{CS}$ in response to the switching current $I_P$.

The reflected signal $V_S$ is correlated to the output voltage $V_O$ during the period that the transformer 10 is demagnetized. Therefore, the information of the output voltage $V_O$ can only be sampled when the transformer 10 is switched on/off. A resistor 53 is connected to the controller 50 (an input terminal COMR) for the output cable compensation. The detail operation of the cable compensation can be found in the prior art of "Primary-side controlled switching regulator", U.S. Pat. No. 7,352,595.

Because the switching frequency of the switching signal $S_W$ is decreased during the light load condition or no load condition for reducing the power loss of the power converter, the information of the output voltage $V_O$ can not be detected in between the switching of the transformer 10. Thus, a significant voltage drop of the output voltage $V_O$ would be happened when the output load of the power converter is increased rapidly from the light load to heavy load.

FIG. 2 shows the waveforms of the switching signal $S_W$, the output load LOAD, and the output voltage $V_O$ of the primary side regulation power converter shown in FIG. 1. The voltage level of the output voltage $V_O$ is decreased significantly when the output load is increased suddenly during the light load condition. In the light load condition, the long switching period of the switching signal $S_W$ is generated for reducing the switching loss of the power converter. Accordingly, because the low response of the power converter to the change of the output load is generated, the significant voltage drop $\Delta V_{OI}$ of the output voltage $V_O$ would be happened when the output load of the power converter is increased rapidly from the light load to the heavy load.

BRIEF SUMMARY OF THE INVENTION

The objective of the present invention is to provide a control circuit with the output cable compensation and fast dynamic response for power converters, and it reduces the voltage drop of the output when the output load is changed.

A control circuit of a power converter according to the present invention comprises a signal generation circuit, a PWM circuit, and a regulation circuit. The signal generation circuit generates an oscillation signal in accordance with an output load of the power converter. The PWM circuit generates a switching signal according to a voltage-loop signal, a current-loop signal and the oscillation signal for regulating an output of the power converter. The regulation circuit is coupled to receive a compensation signal. The compensation signal is coupled to increase a switching frequency of the switching signal once the output of the power converter is lower than a low-voltage threshold. The oscillation signal is coupled to determine the switching frequency of the switching signal.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF EMBODIMENTS

Figure 3:
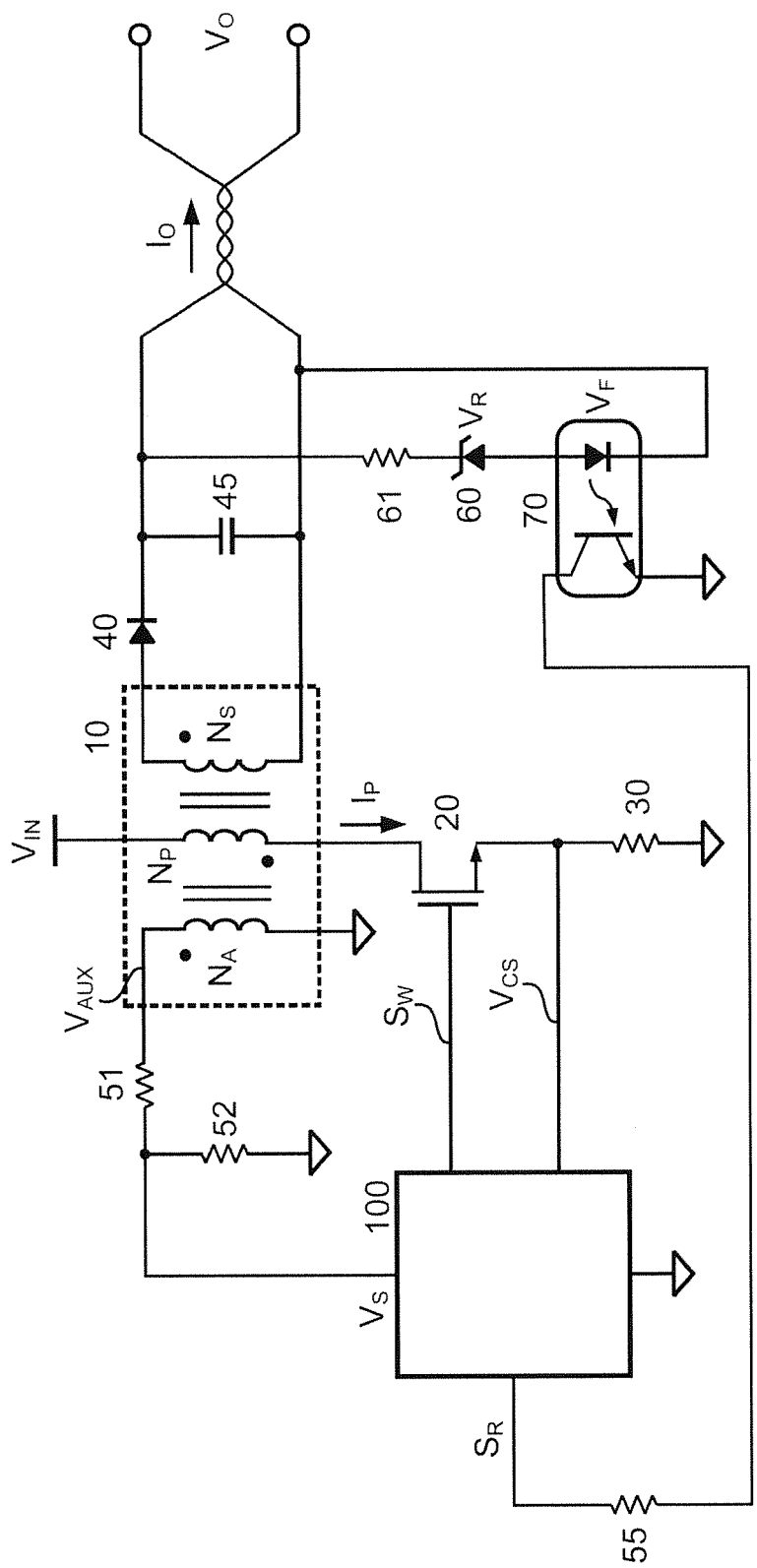
FIG. 3 is a circuit schematic of an embodiment of the power converter according to the present invention.

FIG. 3 is a circuit schematic of an embodiment of the power converter according to the present invention. The power converter comprises the transformer 10 having the primary winding $N_P$, the secondary winding $N_S$, and the auxiliary winding $N_A$. The primary winding $N_P$ is coupled to receive the input voltage $V_{IN}$. The secondary winding $N_S$ generates the output voltage $V_O$ via the diode 40 and the capacitor 45. The transistor 20 is coupled to switch the transformer 10 for transferring the energy from the input voltage $V_{IN}$ to the output voltage $V_O$. When the transistor 20 is turned on, the transformer 10 is magnetized and the switching current $I_P$ of the transformer 10 is flowed through the transistor 20. The current-sense device 30 coupled between the transistor 20 and the ground senses the switching current $I_P$ to generate the current-sense signal $V_{CS}$ coupled to a control circuit 100. Therefore, the current-sense signal $V_{CS}$ is correlated to the switching current $I_P$ of the transformer 10.

The transformer 10 is demagnetized and the energy of the transformer 10 is delivered to the output voltage $V_O$ once the transistor 20 is turned off. Meanwhile, the reflected voltage $V_{AUX}$ is generated at the auxiliary winding $N_A$ of the transformer 10. The control circuit 100 is coupled to the voltage divider developed by the resistors 51 and 52 to sample the reflected signal $V_S$. The reflected signal $V_S$ is thus correlated to the reflected voltage $V_{AUX}$. In other words, the control circuit 100 is coupled to sample the reflected voltage $V_{AUX}$ of the transformer 10 through the auxiliary winding $N_A$ of the transformer 10 and the resistors 51, 52. The reflected voltage $V_{AUX}$ is correlated to the output voltage $V_O$ during the period that the transformer 10 is demagnetized.

A first terminal of the resistor 51 is coupled to the auxiliary winding $N_A$. The resistor 52 is coupled between a second terminal of the resistor 51 and the ground. The control circuit 100 is connected to the joint of the resistors 51 and 52 to sample the reflected signal $V_S$ for sampling the reflected voltage $V_{AUX}$ of the transformer 10. The switching signal $S_W$ is generated by the control circuit 100 to control the transistor 20 for switching the transformer 10 and regulating the output (output voltage $V_O$ and/or output current $I_O$) of the power converter. A resistor 55 is coupled to the control circuit 100 for the output cable compensation. The control circuit 100 is a primary side regulation circuit including a voltage loop and a current loop. The switching frequency of its switching signal $S_W$ is decreased when the power converter is operated in the light load condition or the no load condition. The power converter is operated in the sleep mode or the burst mode when the load condition is the light load condition or the no load condition.

A signal-transfer device, such as an opto-coupler 70, is coupled to the resistor 55 and the output terminal of the power converter. The opto-coupler 70 associated with the resistor 55 generates a compensation signal $S_R$ coupled to a terminal of the control circuit 100 for both output cable compensation and wake-up. The compensation signal $S_R$ is utilized to wake up the control circuit 100 when the switching frequency of the switching signal $S_W$ is low and the output voltage $V_O$ is lower than a low-voltage threshold. That is, the compensation signal $S_R$ is generated when the switching frequency of the switching signal $S_W$ is low and the output voltage $V_O$ of the power converter is lower than the low-voltage threshold. The low-voltage threshold is determined by a reference device 60 (with a reference voltage $V_R$) and a forward-diode voltage $V_F$ of the opto-coupler 70 for example. The compensation signal $S_R$ is applied to wake up the control circuit 100 for generating the switching signal $S_W$ when the control circuit 100 is operated in the light load condition and the voltage level of the output voltage $V_O$ is lower than the low-voltage threshold.

A first terminal of a resistor 61 is coupled to the output terminal of the power converter. The reference device 60 is coupled between a second terminal of the resistor 61 and the opto-coupler 70. The opto-coupler 70 is coupled to the output terminal of the power converter and the control circuit 100 via the resistor 55. The reference device 60 can be a Zener diode according to one embodiment of the present invention.

Figure 4:
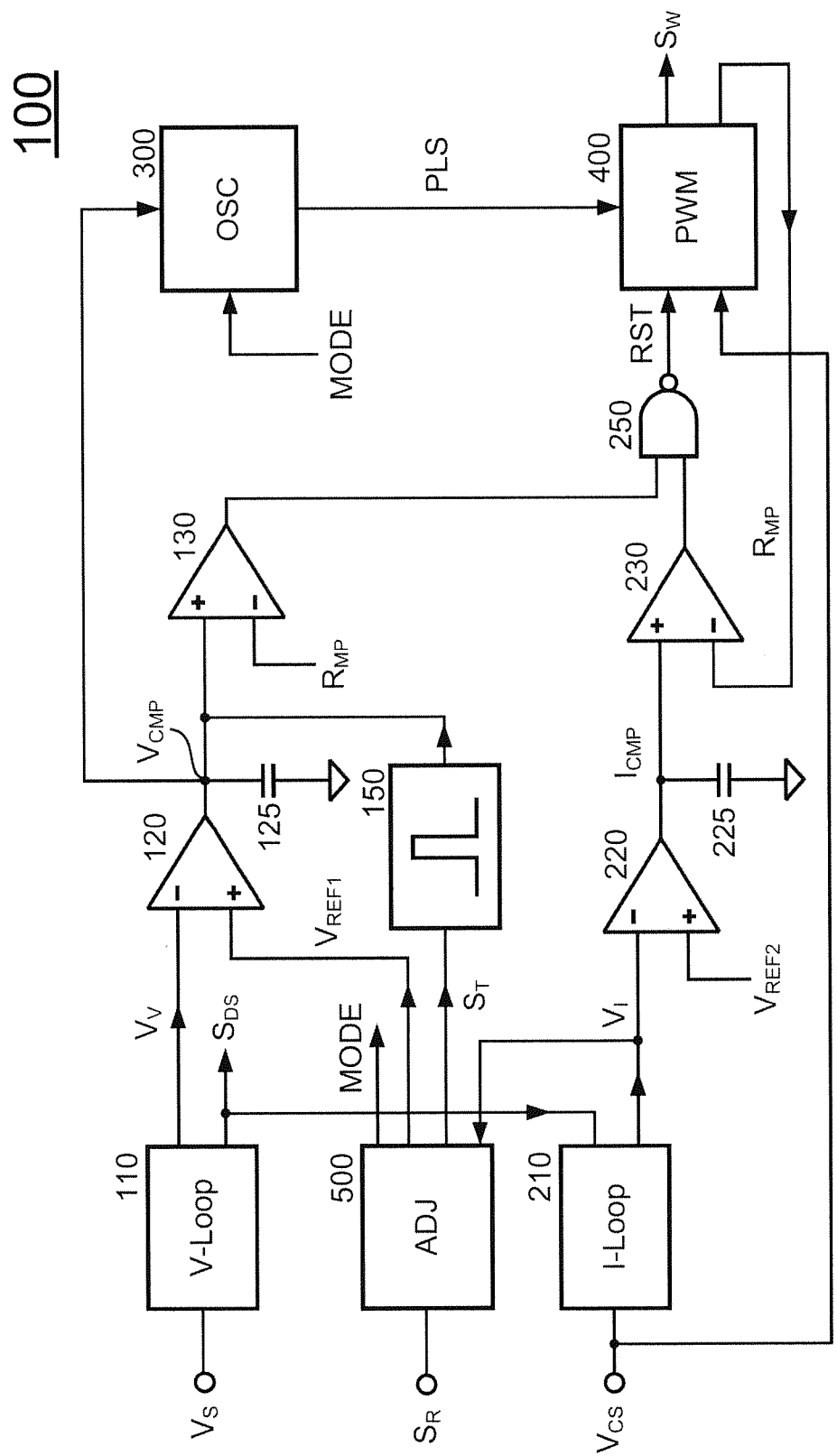
FIG. 4 is a circuit schematic of an embodiment of the control circuit according to the present invention.

FIG. 4 is a circuit schematic of an embodiment of the control circuit 100 according to the present invention. It includes a voltage detection circuit (V-Loop) 110 to generate a voltage feedback signal $V_V$ in accordance with the reflected signal $V_S$. The voltage feedback signal $V_V$ is coupled to a first error amplifier 120 for generating a voltage-loop signal $V_{CMP}$. In other words, the voltage detection circuit 110 is utilized to detect the reflected signal $V_S$ for generating the voltage-loop signal $V_{CMP}$.

The voltage detection circuit 110 further generates a demagnetized signal $S_{DS}$ in response to the reflected signal $V_S$. The demagnetized signal $S_{DS}$ is coupled to a current detection circuit (I-Loop) 210. The current detection circuit 210 generates a current feedback signal $V_1$ in accordance with the current-sense signal $V_{CS}$ and the demagnetized signal $S_{DS}$. The current feedback signal $V_1$ is correlated to the output current $I_O$ (as shown in FIG. 3) of the power converter. The current feedback signal $V_1$ is coupled to a second error amplifier 220 for generating a current-loop signal $I_{CMP}$. In other words, the current detection circuit 210 is utilized to detect the switching current $I_P$ of the transformer 10 (as shown in FIG. 3) for generating the current-loop signal $I_{CMP}$ because the current-sense signal $V_{CS}$ is correlated to the switching current $I_P$ of the transformer 10.

The voltage feedback signal $V_V$ is coupled to a negative input terminal of the first error amplifier 120 to generate the voltage-loop signal $V_{CMP}$. The first error amplifier 120 is a trans-conductance error amplifier according to one embodiment of the present invention. A first reference signal $V_{REF1}$ is supplied to a positive input terminal of the first error amplifier 120. An output terminal of the first error amplifier 120 is coupled to generate the voltage-loop signal $V_{CMP}$. Therefore, the first error amplifier 120 generates the voltage-loop signal $V_{CMP}$ in accordance with the reflected signal $V_S$. In other words, the level of the voltage-loop signal $V_{CMP}$ is related to the voltage level of the output voltage $V_O$ (as shown in FIG. 3) and the output load of the power converter.

A first capacitor 125 is used for the frequency compensation of the voltage-loop signal $V_{CMP}$. The first capacitor 125 is coupled to the output terminal of the first error amplifier 120. The voltage-loop signal $V_{CMP}$ is further coupled to generate the switching signal $S_W$ through a first comparator 130, a NAND gate 250 and a PWM circuit (PWM) 400. A positive input terminal of the first comparator 130 is coupled to the first capacitor 125 and the output terminal of the first error amplifier 120 to receive the voltage-loop signal $V_{CMP}$. A negative input terminal of the first comparator 130 receives a ramp signal $R_{MP}$. The ramp signal $R_{MP}$ is generated by the PWM circuit 400. An output terminal of the first comparator 130 is coupled to a first input terminal of the NAND gate 250 for generating a reset signal RST. The reset signal RST is coupled to the PWM circuit 400 to turn off the switching signal $S_W$ and modulate the switching frequency of the switching signal $S_W$.

The voltage-loop signal $V_{CMP}$ is also coupled to a signal generation circuit (OSC) 300 to modulate the frequency of an oscillation signal PLS generated by the signal generation circuit 300 and the switching frequency of the switching signal $S_W$. Thus, the signal generation circuit 300 generates the oscillation signal PLS in accordance with the output load of the power converter because the voltage-loop signal $V_{CMP}$ is related to the output load of the power converter. Further, the frequency of the oscillation signal PLS and the switching frequency of the switching signal $S_W$ are decreased in response to the decrease of the voltage-loop signal $V_{CMP}$ and the decrease of the output load of the power converter. The oscillation signal PLS is coupled to the PWM circuit 400 to turn on the switching signal $S_W$ and determine the switching frequency of the switching signal $S_W$.

The current feedback signal $V_1$ is coupled to a negative input terminal of the second error amplifier 220 to generate the current-loop signal $I_{CMP}$. The second error amplifier 220 is a trans-conductance error amplifier according to one embodiment of the present invention. A second reference signal $V_{REF}$) is supplied to a positive input terminal of the second error amplifier 220. An output terminal of the second error amplifier 220 is coupled to generate the current-loop signal $I_{CMP}$. A second capacitor 225 is coupled to the output terminal of the second error amplifier 220. The second capacitor 225 is used for the frequency compensation of the current-loop signal $I_{CMP}$. The level of the current-loop signal $I_{CMP}$ s related to the output current $I_O$ (as shown in FIG. 3) of the power converter.

The current-loop signal $I_{CMP}$ is further coupled to generate the switching signal $S_W$ through a second comparator 230, the NAND gate 250 and the PWM circuit 400. A positive input terminal of the second comparator 230 is coupled to the second capacitor 225 and the output terminal of the second error amplifier 220 to receive the current-loop signal $I_{CMP}$. A negative input terminal of the second comparator 230 receives the ramp signal $R_{MP}$. An output terminal of the second comparator 230 is coupled to a second input terminal of the NAND gate 250 for generating the reset signal RST. An output terminal of the NAND gate 250 generates the reset signal RST coupled to the PWM circuit 400 to turn off the switching signal $S_W$. The current-loop signal $I_{CMP}$ is utilized to regulate the output current $I_O$ of the power converter as a constant. The PWM circuit 400 further receives the current-sense signal $V_{CS}$ for modulating the switching signal $S_W$.

The detail operation of the voltage detection circuit 110, the current detection circuit 210, the voltage-loop signal $V_{CMP}$, and the current-loop signal $I_{CMP}$ can be found in "Close-loop PWM controller for primary-side controlled power converters", U.S. Pat. No. 7,016,204. The detail operation of the frequency modulation for the switching signal $S_W$ operated in the light load can be found in "Switching control circuit having off-time modulation to improve efficiency of primary-side controlled power supply", U.S. Pat. No. 7,362,593.

Figure 8:
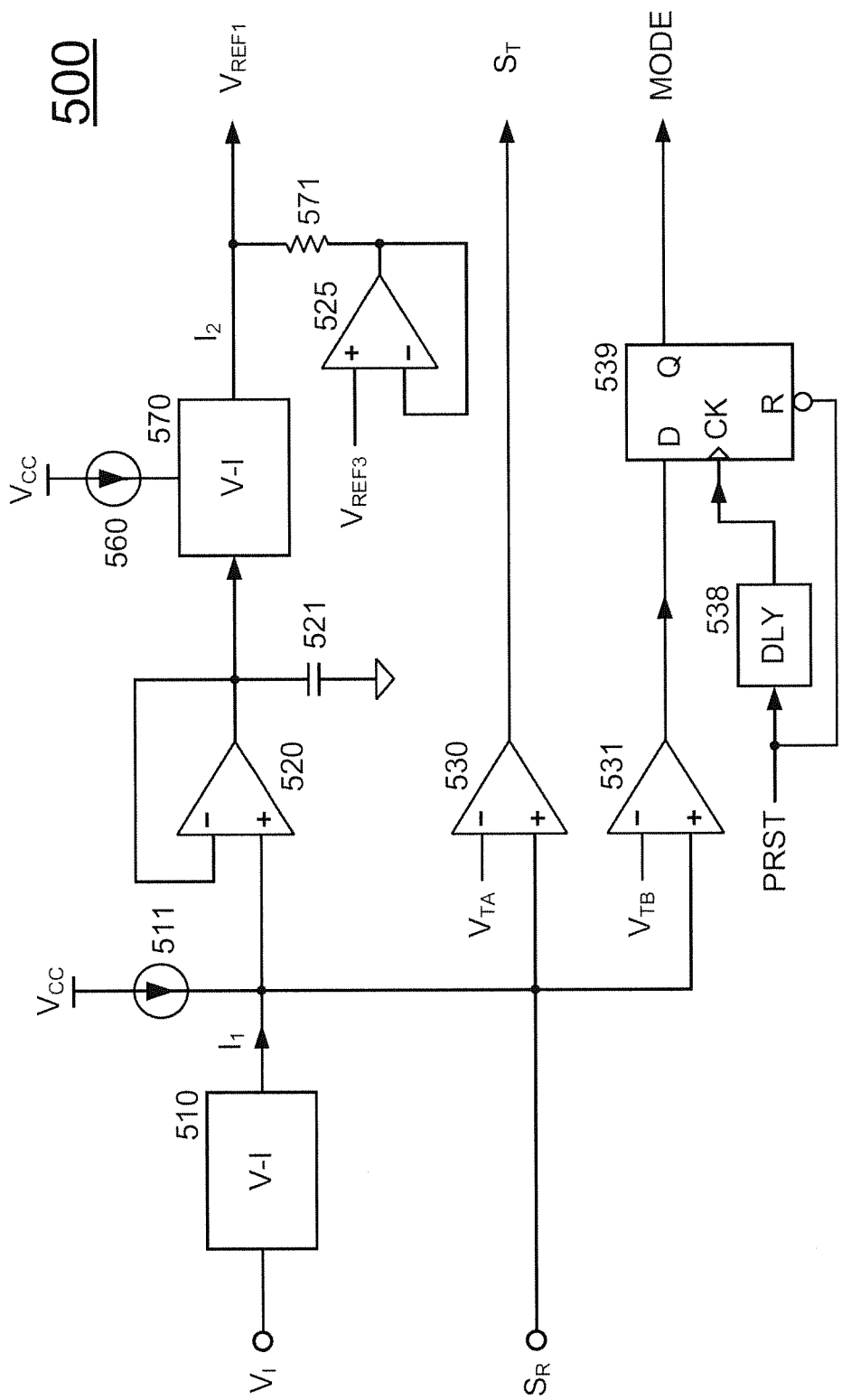
FIG. 8 is a circuit schematic of an embodiment of the regulation circuit in accordance with the present invention.

A regulation circuit (ADJ) 500 is coupled to receive the compensation signal $S_R$. In normal operation, the compensation signal $S_R$ is pulled low by the opto-coupler 70 and the resistor 55 (as shown in FIG. 3). Once the output voltage $V_O$ is lower than the low-voltage threshold, the compensation signal $S_R$ will be pulled high. When it is higher than a threshold $V_{T4}$ (as shown in FIG. 8), the regulation circuit 500 will generate a signal $S_T$. The signal $S_T$ is coupled to drive a boost circuit 150. The boost circuit 150 will generate a pulse signal in response to the signal $S_T$ to charge the first capacitor 125 and increase the level of the voltage-loop signal $V_{CMP}$. Thus, the signal $S_T$ is used to increase the level of the voltage-loop signal $V_{CMP}$ when the output voltage $V_O$ is lower than the low-voltage threshold. The frequency of the oscillation signal PLS and the switching frequency of the switching signal $S_W$ will be increased in response to the increase of the level of the voltage-loop signal $V_{CMP}$. Accordingly, the frequency of the oscillation signal PLS and the switching frequency of the switching signal $S_W$ are modulated by the voltage-loop signal $V_{CMP}$.

Figure 9:
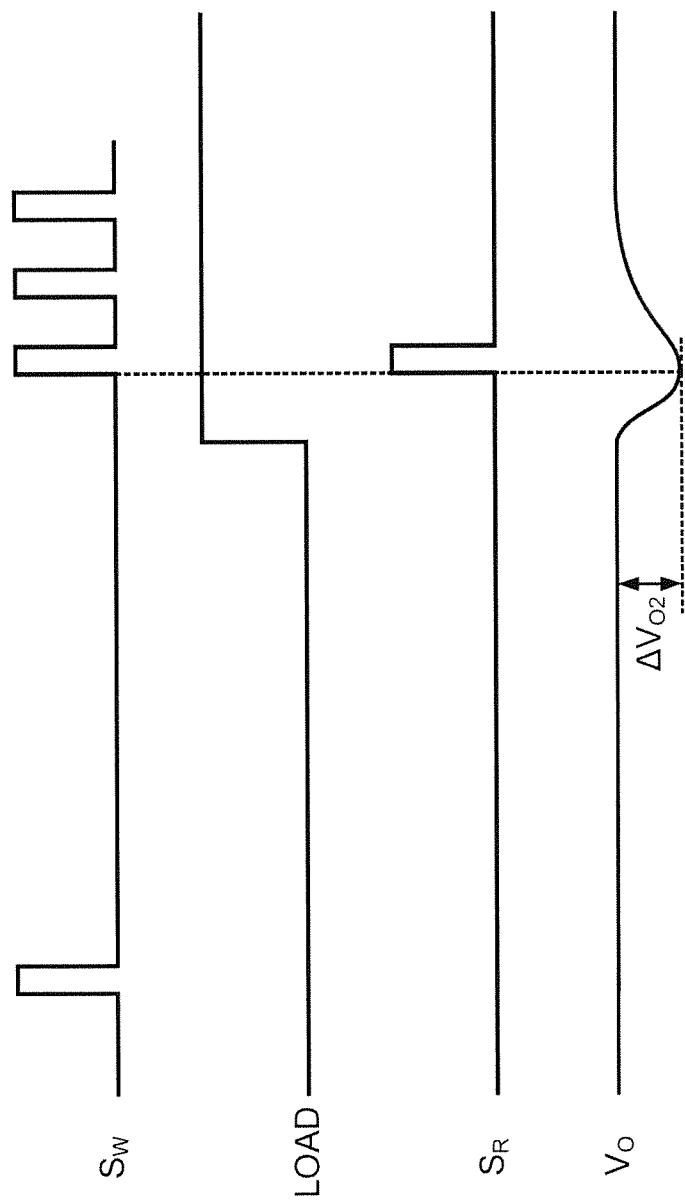
FIG. 9 shows waveforms of the switching signal $S_W$, the output load LOAD, the compensation signal $S_R$, and the output voltage $V_O$ in accordance with the present invention.

During the light load condition, the frequency of the oscillation signal PLS and the switching frequency of the switching signal $S_W$ are decreased to few Hz. Once the compensation signal $S_R$ and the signal $S_T$ are generated (logic-high level), the frequency of the oscillation signal PLS and the switching frequency of the switching signal $S_W$ will be increased immediately (such as >20 KHz) to reduce the voltage drop of the output voltage $V_O$. The waveform of the output voltage $V_O$ is shown in FIG. 9. Thus, during the light load condition, the compensation signal $S_R$ is coupled to increase the frequency of the oscillation signal PLS and the switching frequency of the switching signal $S_W$.

Figure 1:
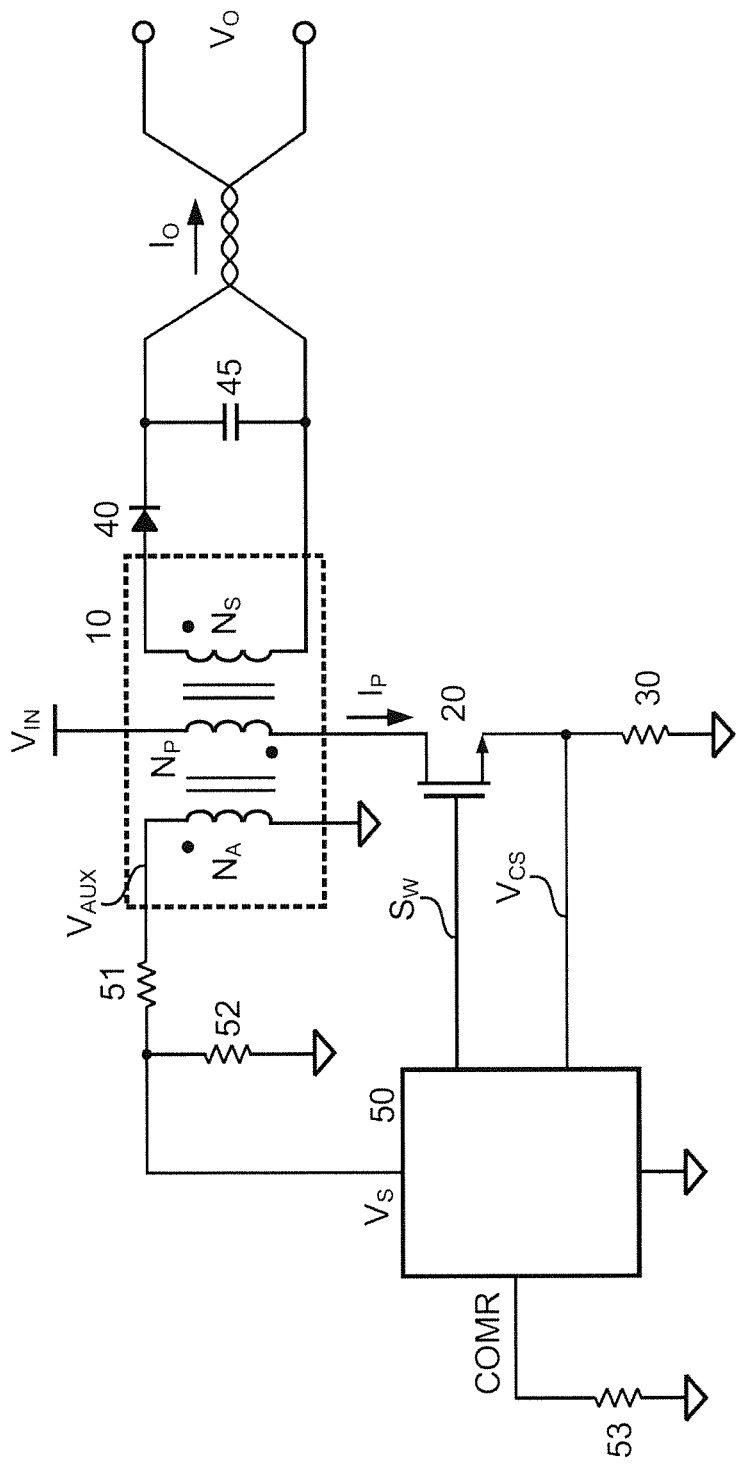
FIG. 1 is a circuit schematic of a prior art of the primary side regulation power converter.
Figure 2:
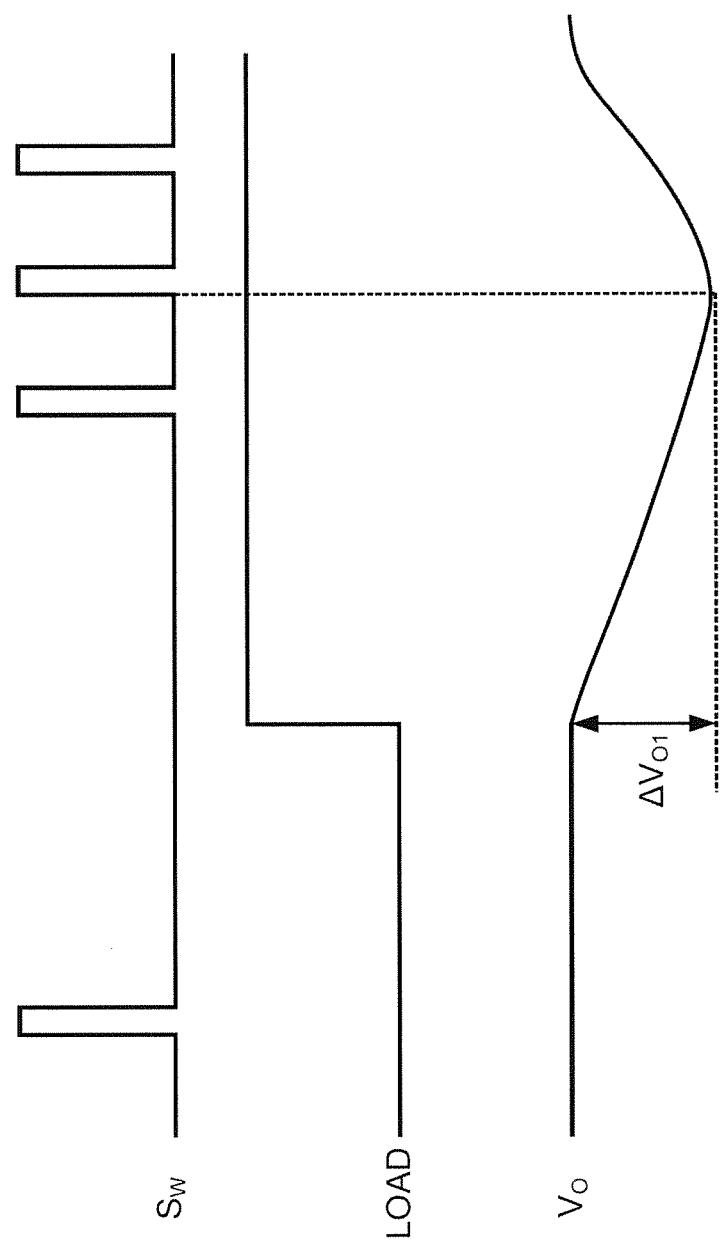
FIG. 2 shows the waveforms of the switching signal $S_W$, the output load LOAD, and the output voltage $V_O$ of the primary side regulation power converter shown in FIG. 1.

As shown in FIG. 9, the power converter is operated in the light load condition. The compensation signal $S_R$ is generated (logic-high level) when the output voltage $V_O$ is lower than the low-voltage threshold because the output load LOAD is increased suddenly during the power converter is operated in the light load condition. The compensation signal $S_R$ is applied to wake up the control circuit 100 (as shown in FIG. 3) for modulating the switching signal $S_W$. The switching frequency of the switching signal $S_W$ is increased. Therefore, the fast dynamic response for the power converter can be achieved. It also can reduce the voltage drop $\Delta V_{O2}$ of the output voltage $V_O$. As shown in FIG. 9, the voltage drop $\Delta V_{O2}$ is significantly smaller than the voltage drop $\Delta V_{O1}$ shown in FIG. 2.

During the none-light-load condition, the compensation signal $S_R$ is lower than the threshold $V_{T4}$, the level of the compensation signal $S_R$ is determined by the resistance of the resistor 55 and the output current $I_O$ of the power converter for the output cable compensation because the current feedback signal $V_1$ is correlated to the output current $I_O$. Therefore, the first reference signal $V_{REF1}$ is generated and modulated by the regulation circuit 500 in accordance with the output current $I_O$ and the resistance of the resistor 55. The regulation circuit 500 further generates a signal MODE coupled to the signal generation circuit 300 to determine the minimum switching frequency of the switching signal $S_W$. If the opto-coupler 70 is not equipped for the wake-up function of the control circuit 100 in the light load operation, then the signal MODE will be disabled (logic-low level) to set the minimum switching frequency to a higher frequency for improving the response time of the power converter. If the opto-coupler 70 is installed for the wake-up, then the signal MODE will be enabled to set the minimum switching frequency as very low frequency to minimize the power loss for light load operation.

Figure 5:
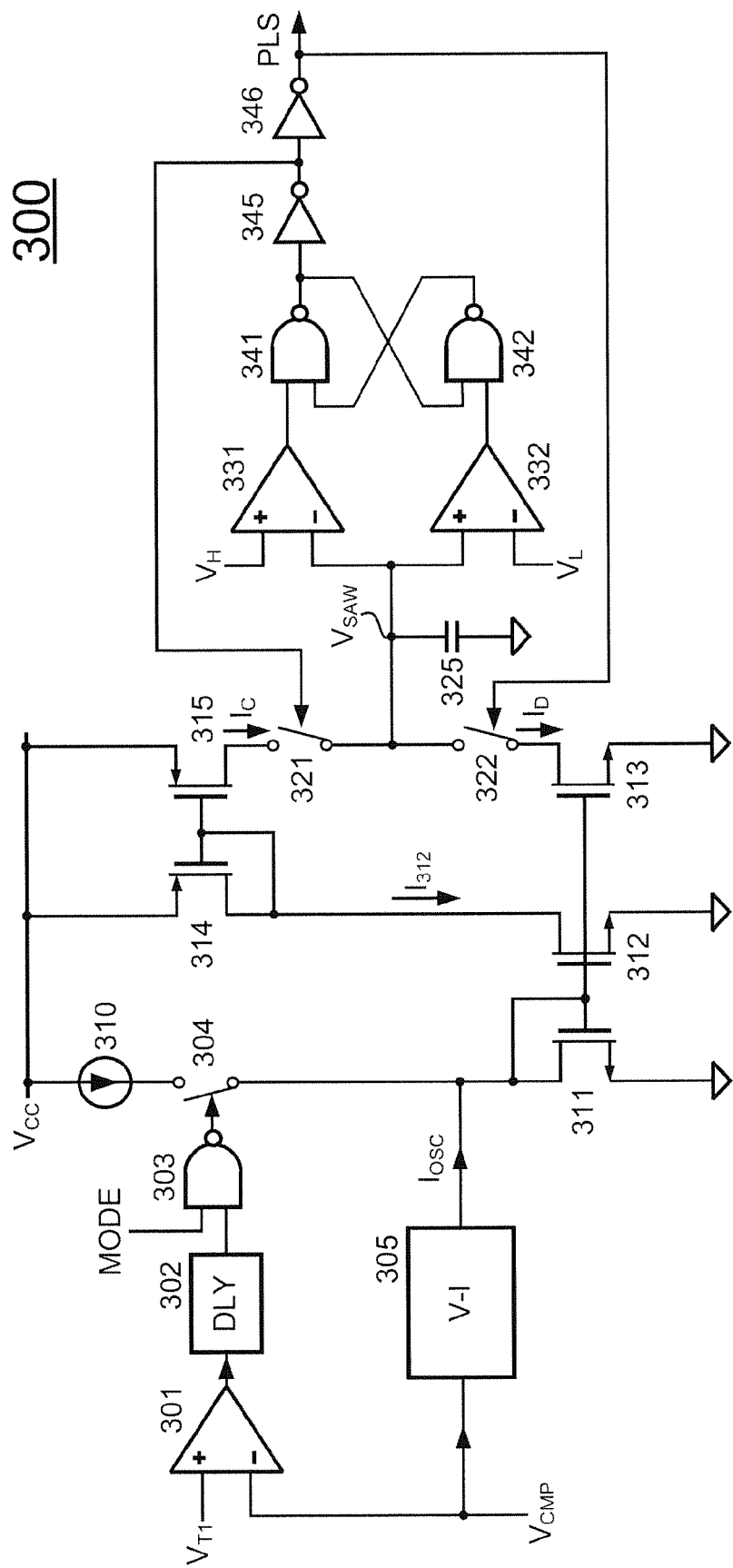
FIG. 5 is a circuit schematic of an embodiment of the signal generation circuit in accordance with the present invention.

FIG. 5 is a circuit schematic of an embodiment of the signal generation circuit 300 in accordance with the present invention. A voltage-to-current converter (V-I) 305 generates a current $I_{OSC}$ in accordance with the voltage-loop signal $V_{CMP}$. The level of the current $I_{OSC}$ is proportional to the level of the voltage-loop signal $V_{CMP}$. The current $I_{OSC}$ is coupled to charge and discharge a capacitor 325 through current mirrors, a charge switch 321 and a discharge switch 322 for generating the oscillation signal PLS. When the level of the voltage-loop signal $V_{CMP}$ is decreased, the frequency of the oscillation signal PLS is decreased.

A first current mirror comprises transistors 311 and 313. A second current mirror comprises transistors 311 and 312. A third current mirror includes transistors 314 and 315. The first current mirror generates a discharge current $I_D$ for discharging the capacitor 325. Gates of the transistors 311 and 313 are coupled together, and sources of the transistors 311 and 313 are coupled to the ground. A drain of the transistor 311 is coupled to the gates of the transistors 311 and 313. The drain of the transistor 311 further receives the current $I_{OSC}$. A drain of the transistor 313 generates the discharge current $I_D$. The second current mirror generates a current $I_{312}$. A gate of the transistor 312 is coupled to the gate of the transistor 311. A source of the transistor 312 is coupled to the ground. A drain of the transistor 312 generates the current $I_{312}$.

The third current mirror generates a charge current $I_C$ in response to the current $I_{312}$ for charging the capacitor 325. Sources of the transistors 314 and 315 are coupled to the supply voltage $V_{CC}$. Gates of the transistors 314 and 315 are coupled together. A drain of the transistor 314 is coupled to the drain of the transistor 312 to receive the current $I_{312}$. The drain of the transistor 314 is further coupled to the gates of the transistors 314 and 315. A drain of the transistor 315 generates the charge current $I_C$.

The charge switch 321 is coupled between the drain of the transistor 315 and a first terminal of the capacitor 325. The charge current $I_C$ charges the capacitor 325 when the charge switch 321 is turned on. The discharge switch 322 is coupled between the drain of the transistor 313 and the first terminal of the capacitor 325. The discharge current $I_D$ discharges the capacitor 325 when the discharge switch 322 is turned on. A signal $V_{SAW}$ is thus generated at the capacitor 325. A second terminal of the capacitor 325 is coupled to the ground.

The signal generation circuit 300 further comprises comparators 331, 332, NAND gates 341, 342, inverters 345 and 346 for generating the oscillation signal PLS. A positive input terminal of the comparator 331 is coupled to receive a threshold $V_H$, and a negative input terminal of the comparator 331 is coupled to receive the signal $V_{SAW}$. The comparator 331 compares the signal $V_{SAW}$ with the threshold $V_H$. A negative input terminal of the comparator 332 is coupled to receive a threshold $V_L$, and a positive input terminal of the comparator 332 is coupled to receive the signal $V_{SAW}$. The comparator 332 compares the signal $V_{SAW}$ with the threshold $V_L$.

A first input terminal of the NAND gate 341 is coupled to an output terminal of the comparator 331. An output terminal of the NAND gate 342 is coupled to a second input terminal of the NAND gate 341. A first input terminal of the NAND gate 342 is coupled to an output terminal of the comparator 332. A second input terminal of the NAND gate 342 is coupled to an output terminal of the NAND gate 341. An input terminal of the inverter 345 is coupled to the output terminal of the NAND gate 341. An output terminal of the inverter 345 is coupled to an input terminal of the inverter 346 and a control terminal of the charge switch 321. The charge switch 321 is thus controlled by an output signal of the inverter 345. An output terminal of the inverter 346 is coupled to a control terminal of the discharge switch 322 and the PWM circuit 400 (as shown in FIG. 4). The oscillation signal PLS is generated at the output terminal of the inverter 346. That is to say, the discharge switch 322 is controlled by the oscillation signal PLS.

The signal generation circuit 300 further includes a current source 310. The current source 310 is utilized to determine a minimum charge current and a minimum discharge current for the capacitor 325. Thus, the current source 310 is utilized to determine a minimum frequency of the oscillation signal PLS. A first terminal of the current source 310 is coupled to the supply voltage $V_{CC}$. A switch 304 is coupled between a second terminal of the current source 310 and the drain of the transistor 311 to enable the current source 310.

The voltage-loop signal $V_{CMP}$ is further coupled to a negative input terminal of a comparator 301. A positive input terminal of the comparator 301 is coupled to receive a threshold $V_{T1}$. The comparator 301 is used to compare the voltage-loop signal $V_{CMP}$ with the threshold $V_{T1}$. An output terminal of the comparator 301 is coupled to an input terminal of a time-delay circuit (DLY) 302. The time-delay circuit 302 is utilized to delay an output of the comparator 301. An output terminal of the time-delay circuit 302 is coupled to a first input terminal of a NAND gate 303. A second input terminal of the NAND gate 303 is coupled to receive the signal MODE. An output terminal of the NAND gate 303 is coupled to control the switch 304.

The switch 304 is coupled to enable the current source 310. The switch 304 is turned on and the current source 310 is enabled when the voltage-loop signal $V_{CMP}$ is higher than the threshold $V_{T1}$. Thus, the minimum frequency of the oscillation signal PLS and the switching signal $S_W$ can be a first frequency $F_1$ (such as 1.5 KHz). In other words, the minimum frequency is the first frequency $F_1$ when the level of the voltage-loop signal $V_{CMP}$ is higher than the threshold $V_{T1}$. The first frequency $F_1$ is determined by the current $I_{OSC}$ and the current of the current source 310. That is, the first frequency $F_1$ is determined by a first level of the voltage-loop signal $V_{CMP}$, and the first level of the voltage-loop signal $V_{CMP}$ is higher than the threshold $V_{T1}$.

When the voltage-loop signal $V_{CMP}$ is lower than the threshold $V_{T1}$, then the comparator 301 will turn off the switch 304 (disable the current source 310) via the time-delay circuit 302 (such as with a 10 msec delay) and the NAND gate 303. Therefore, the minimum frequency of the oscillation signal PLS is determined only by the current $I_{OSC}$. Thus, the minimum frequency of the oscillation signal PLS and the switching signal $S_W$ can be lower than a second frequency $F_2$ (such as 5 Hz or lower). The second frequency $F_2$ is lower than the first frequency $F_1$. If the opto-coupler 70 (as shown in FIG. 3) is not equipped, then the signal MODE is disabled (logic-low level). The signal MODE will turn on the switch 304 through the NAND gate 303, the minimum frequency of the oscillation signal PLS and the switching signal $S_W$ will be the first frequency $F_1$. In contrast, if the opto-coupler 70 is equipped, the minimum frequency of the oscillation signal PLS and the switching signal $S_W$ will be the second frequency $F_2$.

Figure 6:
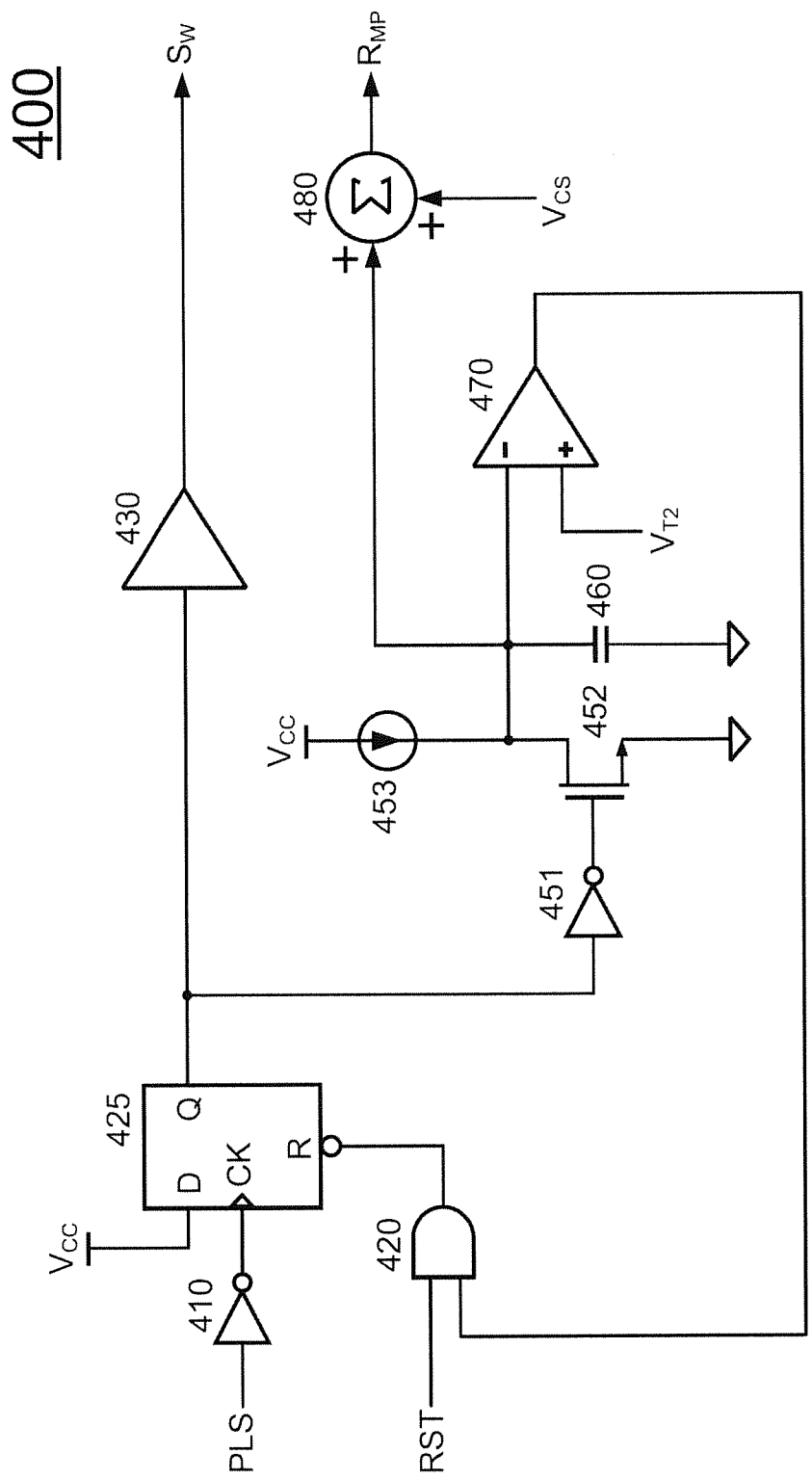
FIG. 6 is a circuit schematic of an embodiment of the PWM circuit in accordance with the present invention.

FIG. 6 shows a circuit schematic of an embodiment of the PWM circuit 400 in accordance with the present invention. The oscillation signal PLS is coupled to turn on the switching signal $S_W$ via an inverter 410, a flip-flop 425 and an output buffer 430. An input terminal D of the flip-flop 425 is coupled to receive the supply voltage $V_{CC}$. The oscillation signal PLS is coupled to a clock input terminal CK of the flip-flop 425 via the inverter 410. An output terminal Q of the flip-flop 425 is coupled to an input terminal of the output buffer 430. An output terminal of the output buffer 430 generates the switching signal $S_W$. The oscillation signal PLS determines the switching frequency of the switching signal $S_W$.

An inverter 451, a transistor 452, a current source 453, a capacitor 460, and a comparator 470 develop a circuit to limit the maximum on-time of the switching signal $S_W$ and generate the ramp signal $R_{MP}$. An output signal generated by the flip-flop 425 is coupled to a gate of the transistor 452 through the inverter 451 to drive the transistor 452. One terminal of the current source 453 is coupled to the supply voltage $V_{CC}$. The other terminal of the current source 453 is coupled to a drain of the transistor 452 and a terminal of the capacitor 460. A source of the transistor 452 and the other terminal of the capacitor 460 are coupled to the ground. The capacitor 460 is charged by the current source 453 when the level of the output signal of the flip-flop 425 is a logic-high level and the transistor 452 is turned off.

A signal generated by the capacitor 460 is coupled to a negative input terminal of the comparator 470. A threshold $V_{T2}$ is supplied to a positive input terminal of the comparator 470. The comparator 470 compares the signal of the capacitor 460 with the threshold $V_{T2}$. An output terminal of the comparator 470 is coupled to a first input terminal of an AND gate 420. The reset signal RST is coupled to a second input terminal of the AND gate 420. An output terminal of the AND gate 420 is coupled to a reset input terminal R of the flip-flop 425. That is to say, an output signal of the comparator 470 and the reset signal RST are coupled to rest the flip-flop 425 for turning off the switching signal $S_W$ through the AND gate 420.

The PWM circuit 400 further comprises an adder 480. The signal generated at the capacitor 460 and the current-sense signal $V_{CS}$ are coupled to the adder 480 for generating the ramp signal $R_{MP}$. Thus, the signal of the capacitor 460 is associated with the current-sense signal $V_{CS}$ to generate the ramp signal $R_{MP}$ for the pulse width modulation (PWM).

Figure 7:
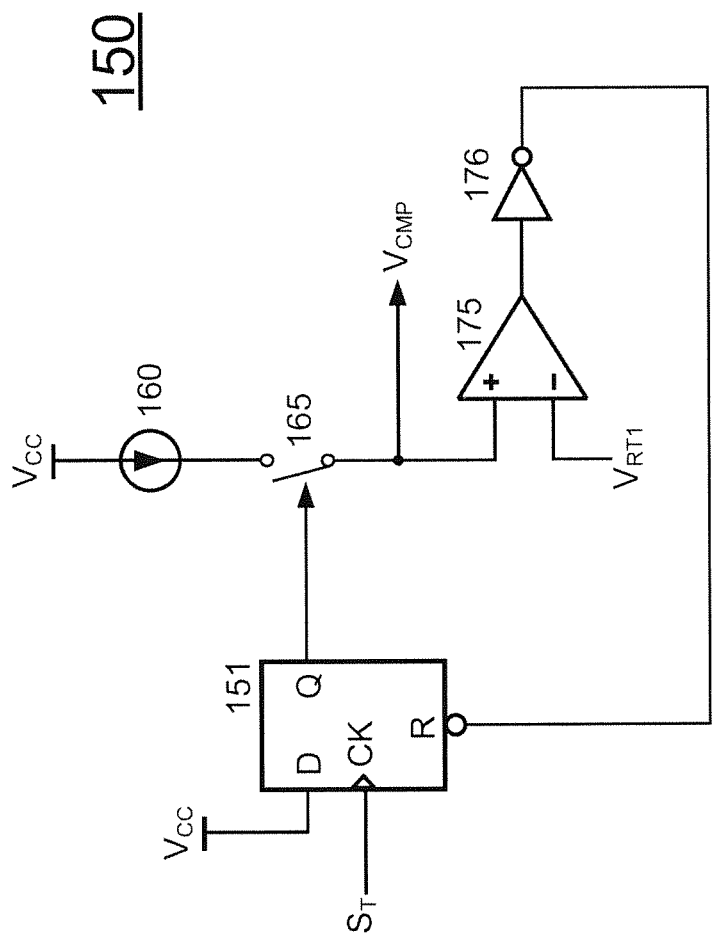
FIG. 7 is a circuit schematic of an embodiment of the boost circuit in accordance with the present invention.

FIG. 7 is a circuit schematic of an embodiment of the boost circuit 150 in accordance with the present invention. The boost circuit 150 comprises a flip-flop 151, a current source 160, a switch 165, a comparator 175, and an inverter 176. The supply voltage $V_{CC}$ is supplied to an input terminal D of the flip-flop 151. The signal $S_T$ is coupled to a clock input terminal CK of the flip-flop 151. An output terminal Q of the flip-flop 151 is coupled to control the switch 165. The switch 165 is coupled between the current source 160 and the first capacitor 125 (as shown in FIG. 4). The current source 160 is further coupled to the supply voltage $V_{CC}$. The signal $S_T$ is coupled to turn on the switch 165 via the flip-flop 151. The current source 160 is coupled to charge the first capacitor 125 (the voltage-loop signal $V_{CMP}$) through the switch 165.

The voltage-loop signal $V_{CMP}$ is coupled to a positive input terminal of the comparator 175. A negative input terminal of the comparator 175 is coupled to receive a threshold $V_{RT1}$. The comparator 175 is utilized to compare the voltage-loop signal $V_{CMP}$ with the threshold $V_{RT1}$. An output terminal of the comparator 175 is coupled to an input terminal of the inverter 176. An output terminal of the inverter 176 is coupled to a reset input terminal R of the flip-flop 151.

Once the level of the voltage-loop signal $V_{CMP}$ is higher than the threshold $V_{RT1}$, the flip-flop 151 will be reset (to turn off the switch 165) through the comparator 175 and the inverter 176. The threshold $V_{RT1}$ determines the level of the voltage-loop signal $V_{CMP}$ when the signal $S_T$ is enabled. Therefore, this circuit determines the switching frequency (such as 20 KHz) of the switching signal $S_W$ when the compensation signal $S_R$ is generated (as shown in FIG. 4). Once the level of the voltage-loop signal $V_{CMP}$ is lower than the threshold $V_{RT1}$, the compensation signal $S_R$ is used to increase the level of the voltage-loop signal $V_{CMP}$.

Furthermore, because the flip-flop 151 is reset when the level of the voltage-loop signal $V_{CMP}$ is higher than the threshold $V_{RT1}$, the generation of the compensation signal $S_R$ will not change the level of the voltage-loop signal $V_{CMP}$ and the switching frequency of the switching signal $S_W$. That is to say, the generation of the compensation signal $S_R$ can increase the switching frequency of the switching signal $S_W$ only when the output load of the power converter is lower than a threshold level.

FIG. 8 is a circuit schematic of an embodiment of the regulation circuit 500 in accordance with the present invention. A voltage-to-current converter (V-I) 510 receives the current feedback signal $V_1$ to generate a current $I_I$ in accordance with the current feedback signal $V_1$. The current $I_1$ is correlated to the output current $I_O$ (as shown in FIG. 3) of the power converter because the current feedback signal $V_1$ is correlated to the output current $I_O$. A constant current source 511 is coupled to the supply voltage $V_{CC}$. The constant current source 511 is utilized to pull high the compensation signal $S_R$ during the light load condition. The current of the constant current source 511 and the current $I_1$ are coupled to the resistor 55 (as shown in FIG. 3) for generating the compensation signal $S_R$ for the output cable compensation and the wake-up. That is, the compensation signal $S_R$ is generated in accordance with the output current $I_O$.

A trans-conductance buffer amplifier 520 and a capacitor 521 provide a low-pass filter and a frequency compensation to the compensation signal $S_R$ for the output cable compensation. A positive input terminal of the trans-conductance buffer amplifier 520 is coupled to receive the compensation signal $S_R$. A negative input terminal of the trans-conductance buffer amplifier 520 is coupled to an output terminal of the trans-conductance buffer amplifier 520. The capacitor 521 is coupled between the output terminal of the trans-conductance buffer amplifier 520 and the ground.

After the low-pass filtering, the signal of the capacitor 521 is further applied to generate a current $I_2$ through another voltage-to-current converter (V-I) 570. The current $I_2$ is correlated to the output current $I_O$ of the power converter. A constant current source 560 determines (limits) the maximum current of the current $I_2$. The constant current source 560 is coupled to the supply voltage $V_{CC}$ and applied to the voltage-to-current converter 570. A reference signal $V_{REF3}$ is coupled to a resistor 571 via a buffer amplifier 525 for generating the first reference signal $V_{REF1}$. Accordingly, the first reference signal $V_{REF1}$ is generated by the regulation circuit 500 in accordance with the compensation signal $S_R$. Because the compensation signal $S_R$ is correlated to the output current $I_O$, the first reference signal $V_{REF1}$ is generated and modulated by the regulation circuit 500 in accordance with the output current $I_O$.

The reference signal $V_{REF3}$ is coupled to a positive input terminal of the buffer amplifier 525. A negative input terminal of the buffer amplifier 525 is coupled to an output terminal of the buffer amplifier 525. A first terminal of the resistor 571 is coupled to the output terminal of the buffer amplifier 525. A second terminal of the resistor 571 is coupled to the current $I_2$. The current $U_2$ and the resistor 571 are utilized to modulate the level of the first reference signal $V_{VREF1}$ for the output cable compensation. If the output current $I_O$ (as shown in FIG. 3) of the power converter is increased, then the level of the first reference signal $V_{VREF1}$ will be increased accordingly to increase the level of the voltage-loop signal $V_{CMP}$ (as shown in FIG. 4) so that the output voltage $V_O$ (as shown in FIG. 3) is increased for compensating the voltage drop in the output cable of the power converter. Accordingly, the compensation signal $S_R$ is used for compensating the voltage-loop signal $V_{CMP}$ for the output cable compensation.

A positive input terminal of a comparator 530 is coupled to receive the compensation signal $S_R$. A negative input terminal of the comparator 530 is coupled to the threshold $V_{TA}$. An output terminal of the comparator 530 outputs the signal $S_T$. The comparator 530 compares the compensation signal $S_R$ with the threshold $V_{TA}$ for generating the signal $S_T$. The comparator 530 will generate the signal $S_T$ when the level of the compensation signal $S_R$ is higher than the threshold $V_{TA}$.

The regulation circuit 500 further includes a comparator 531, a delay circuit (DLY) 538, and a flip-flop 539. A positive input terminal of the comparator 531 is coupled to receive the compensation signal $S_R$. A negative input terminal of the comparator 531 is coupled to a threshold $V_{TB}$. An output terminal of the comparator 531 is coupled to an input terminal D of the flip-flop 539. An output terminal Q of the flip-flop 539 outputs the signal MODE. When the power converter is turned on, the regulation circuit 500 will detect whether the opto-coupler 70 (as shown in FIG. 3) is existed or not? If the opto-coupler 70 is not existed, then the level of the compensation signal $S_R$ will be lower than the threshold $V_{TB}$. Therefore, the output signal of the comparator 531 is disabled, and the flip-flop 539 will disable the signal MODE.

If the opto-coupler 70 is equipped, then the level of the compensation signal $S_R$ will be higher than the threshold $V_{TB}$ during the power-on period. Therefore, the output signal of the comparator 531 is enabled. A power-on-rest signal PRST is coupled to a clock input terminal CK of the flip-flop 539 to clock the flip-flop 539 after a delay (e.g. delay 200 usec after the power is applied to the control circuit 100) via the delay circuit 538. Thus, the flip-flop 539 will generate and enable the signal MODE if the compensation signal $S_R$ is higher than the threshold $V_{TB}$ when the power converter is turned on. The power-on-rest signal PRST is further coupled to a reset input terminal R of the flip-flop 539 to reset the flip-flop 539.

Figure 10:
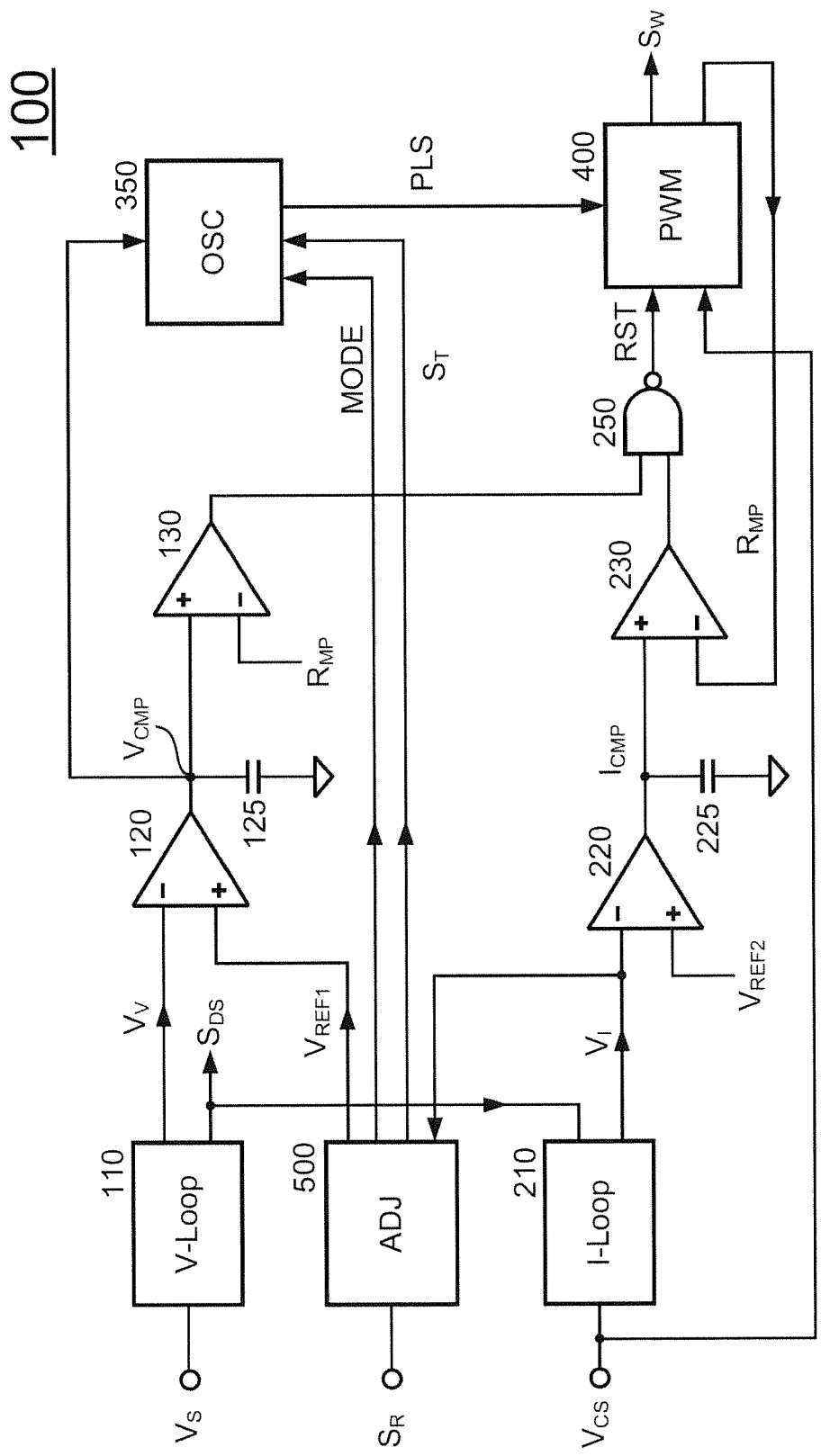
FIG. 10 is a circuit schematic of another embodiment of the control circuit in accordance with the present invention.

FIG. 10 is a circuit schematic of another embodiment of the control circuit 100 in accordance with the present invention. Comparing the control circuit 100 of this embodiment with the control circuit 100 shown in FIG. 4, the control circuit 100 of this embodiment does not have the boost circuit 150, in which the signal $S_T$ from the regulation circuit 500 is directly coupled to a signal generation circuit (OSC) 350 for increasing the frequency of the oscillation signal PLS and the switching frequency of the switching signal $S_W$ when the compensation signal $S_R$ is higher than the threshold $V_{TA}$ (as shown in FIG. 8).

Figure 11:
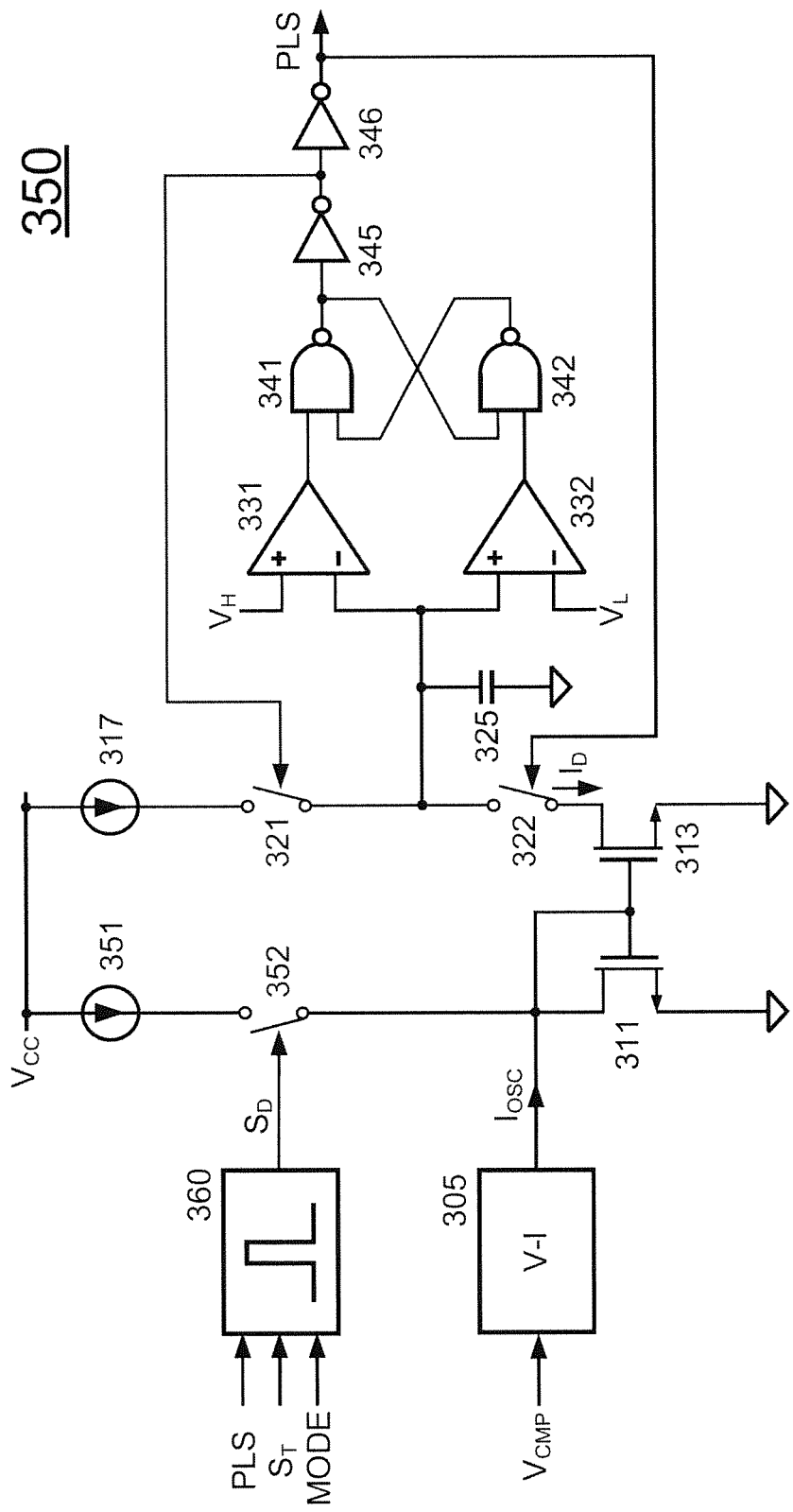
FIG. 11 is a circuit schematic of an embodiment of the signal generation circuit of the control circuit shown in FIG. 10 in accordance with the present invention.

FIG. 11 shows a circuit schematic of an embodiment of the signal generation circuit 350 of the control circuit 100 shown in FIG. 10 in accordance with the present invention. The difference between the signal generation circuit 350 and the signal generation circuit 300 shown in FIG. 5 is that the signal generation circuit 350 further comprises current sources 317, 351, a switch 352, and a pulse generator 360. Further, the signal generation circuit 350 lacks of the comparator 301, the time-delay circuit 302, the NAND gate 303, the switch 304, the current source 310, and the transistors 312, 314, and 315. The different circuits in the signal generation circuit 350 from the signal generation circuit 300 (as shown in FIG. 5) is described in detailed as below. The other circuits of the signal generation circuit 350 are the same as the circuits of the signal generation circuit 300 shown in FIG. 5, so here is no detailed description about them.

The oscillation signal PLS and the signal $S_T$ are coupled to the pulse generator 360 to generate a discharge signal $S_D$ for enabling the switch 352. The switch 352 is coupled between the current source 351 and the drain of the transistor 311. The current source 351 is further coupled to the supply voltage $V_{CC}$. In other words, the oscillation signal PLS and the signal $S_T$ are coupled to enable the switch 352 via the pulse generator 360. Further, the pulse generator 360 receives the signal MODE for generating the discharge signal $S_D$.

The current source 351 is coupled to discharge the capacitor 325 via the switch 352 and the first current mirror developed by the transistors 311 and 313. The frequency of the oscillation signal PLS is increased in response to the increase of the discharge current $I_D$ for the capacitor 325. The current source 317 is coupled between the supply voltage $V_{CC}$ and the charge switch 321 for charging the capacitor 325.

Figure 12:
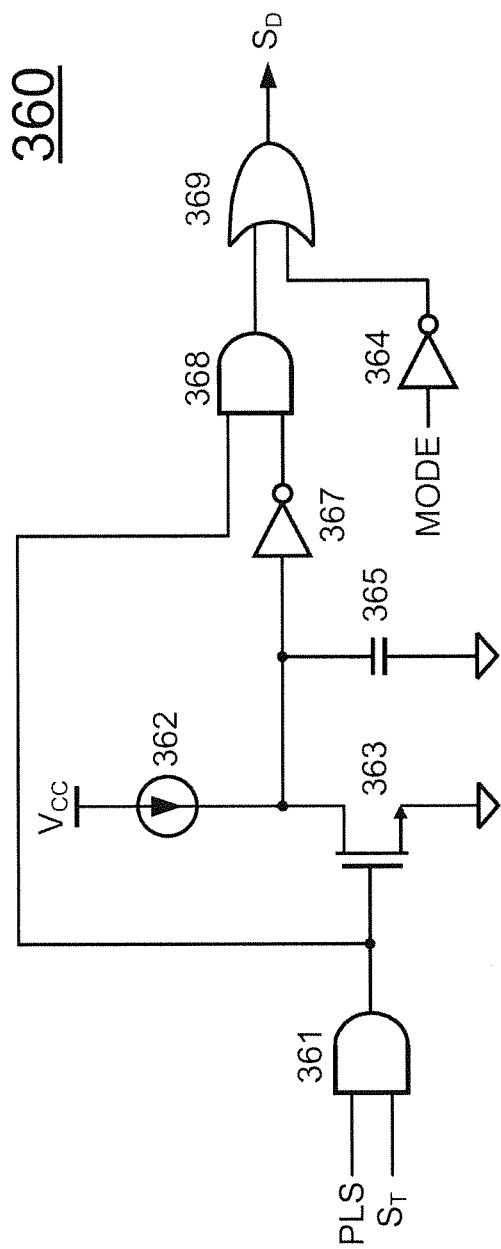
FIG. 12 is a circuit schematic of an embodiment of the pulse generator in accordance with the present invention.

FIG. 12 shows a circuit schematic of an embodiment of the pulse generator 360 of the signal generation circuit 350 in accordance with the present invention. The pulse generator 360 generates the discharge signal $S_D$ in response to the enables of the oscillation signal PLS and the signal $S_T$. The oscillation signal PLS and the signal $S_T$ are coupled to input terminals of an AND gate 361. An output terminal of the AND gate 361 is coupled to a gate of a transistor 363 to drive the transistor 363. One terminal of a current source 362 is coupled to the supply voltage $V_{CC}$. The other terminal of the current source 362 is coupled to a drain of the transistor 363 and one terminal of a capacitor 365. A source of the transistor 363 and the other terminal of the capacitor 365 are coupled to the ground.

The capacitor 365 is charged by the current source 362 when the transistor 363 is turned off. The capacitor 365 is discharged by the transistor 363 when the oscillation signal PLS and the signal $S_T$ are enabled and the transistor 363 is turned on. An input terminal of an inverter 367 is coupled to the capacitor 365. An output terminal of the inverter 367 is coupled to a first input terminal of an AND gate 368. A second input terminal of the AND gate 368 is coupled to the output terminal of the AND gate 361. An output terminal of the AND gate 368 is coupled to a first input terminal of an OR gate 369 to generate the discharge signal $S_D$. Further, the signal MODE is coupled to a second input terminal of the OR gate 369 via an inverter 364. The discharge signal $S_D$ is always enabled if the signal MODE is disabled.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A primary side regulation control circuit of a power converter, comprising:
    a signal generation circuit generating an oscillation signal in accordance with an output load of the power converter;
    a PWM circuit generating a switching signal according to a voltage-loop signal, a current-loop signal and the oscillation signal for regulating an output of the power converter; and
    a regulation circuit coupled to receive a compensation signal through a signal-transfer device;
    wherein the compensation signal is coupled to increase a switching frequency of the switching signal once the output of the power converter is lower than a low-voltage threshold; the oscillation signal is coupled to determine the switching frequency of the switching signal.

2. The circuit as claimed in claim 1, further comprising an error amplifier coupled to generate the voltage-loop signal in accordance with a reflected signal; wherein the error amplifier has a reference signal and is coupled to a frequency compensation capacitor.

3. The circuit as claimed in claim 2, wherein the compensation signal is generated in accordance with an output current of the power converter, and the reference signal is generated and modulated by the regulation circuit in accordance with the output current of the power converter.

4. The circuit as claimed in claim 1, wherein the compensation signal is further used for compensating the voltage-loop signal for an output cable compensation.

5. The circuit as claimed in claim 1, further comprising a terminal coupled to a resistor and the signal-transfer device for generating the compensation signal; wherein the resistor is used to an output cable compensation.

6. The circuit as claimed in claim 1, wherein the switching signal has a minimum frequency; the minimum frequency is a first frequency if the signal-transfer device is not equipped; the minimum frequency is a second frequency if the signal-transfer device is equipped; the first frequency is higher than the second frequency.

7. The circuit as claimed in claim 1, further comprising a boost circuit coupled to the regulation circuit, wherein the regulation circuit drives the boost circuit in response to the compensation signal to increase the switching frequency of the switching signal.

8. A control circuit of a power converter, comprising:
    a signal generation circuit generating an oscillation signal in accordance with an output load of the power converter;
    a PWM circuit generating a switching signal according to a voltage-loop signal, a current-loop signal and the oscillation signal for regulating an output of the power converter; and
    a regulation circuit coupled to receive a compensation signal for an output cable compensation and a wake-up;
    wherein the compensation signal is coupled to increase a switching frequency of the switching signal once the output of the power converter is lower than a low-voltage threshold; the oscillation signal is coupled to determine the switching frequency of the switching signal.

9. The circuit as claimed in claim 8, further comprising a terminal coupled to a resistor and a signal-transfer device for generating the compensation signal.

10. The circuit as claimed in claim 8, wherein the compensation signal is coupled to modulate the level of the voltage-loop signal for the output cable compensation.

11. The circuit as claimed in claim 8, wherein the switching frequency of the switching signal is modulated by the voltage-loop signal; the switching signal has a minimum frequency; the minimum frequency is a first frequency determined by a first level of the voltage-loop signal; the minimum frequency is a second frequency when the voltage-loop signal is lower than a threshold after a time delay; the first frequency is higher than the second frequency.

12. The circuit as claimed in claim 8, wherein the switching signal has a minimum frequency; the minimum frequency is a higher frequency if a signal-transfer device is not equipped for the wake-up; the minimum frequency is a lower frequency if the signal-transfer device is equipped for the wake-up.

* * * * *